(No Model.)
2 Sheets—Sheet 2.
J. F. VOORHEES.
AIR BRAKE FOR CARS.
No. 524,050. Patented Aug. 7, 1894.
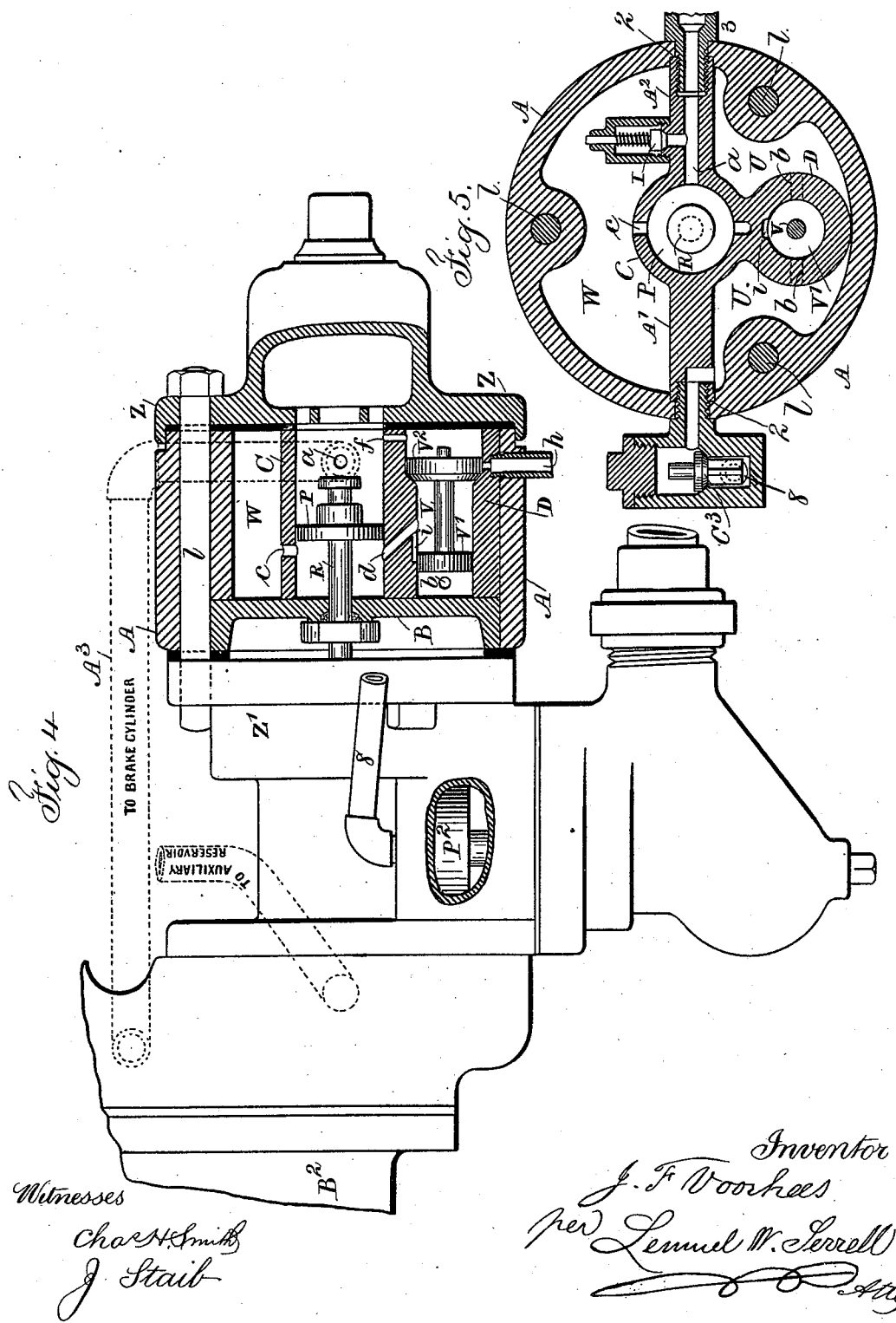
Witnesses
Chas H. Smith
J. Staib
Inventor
J. F. Voorhees
per Lemuel W. Serrell
Atty.

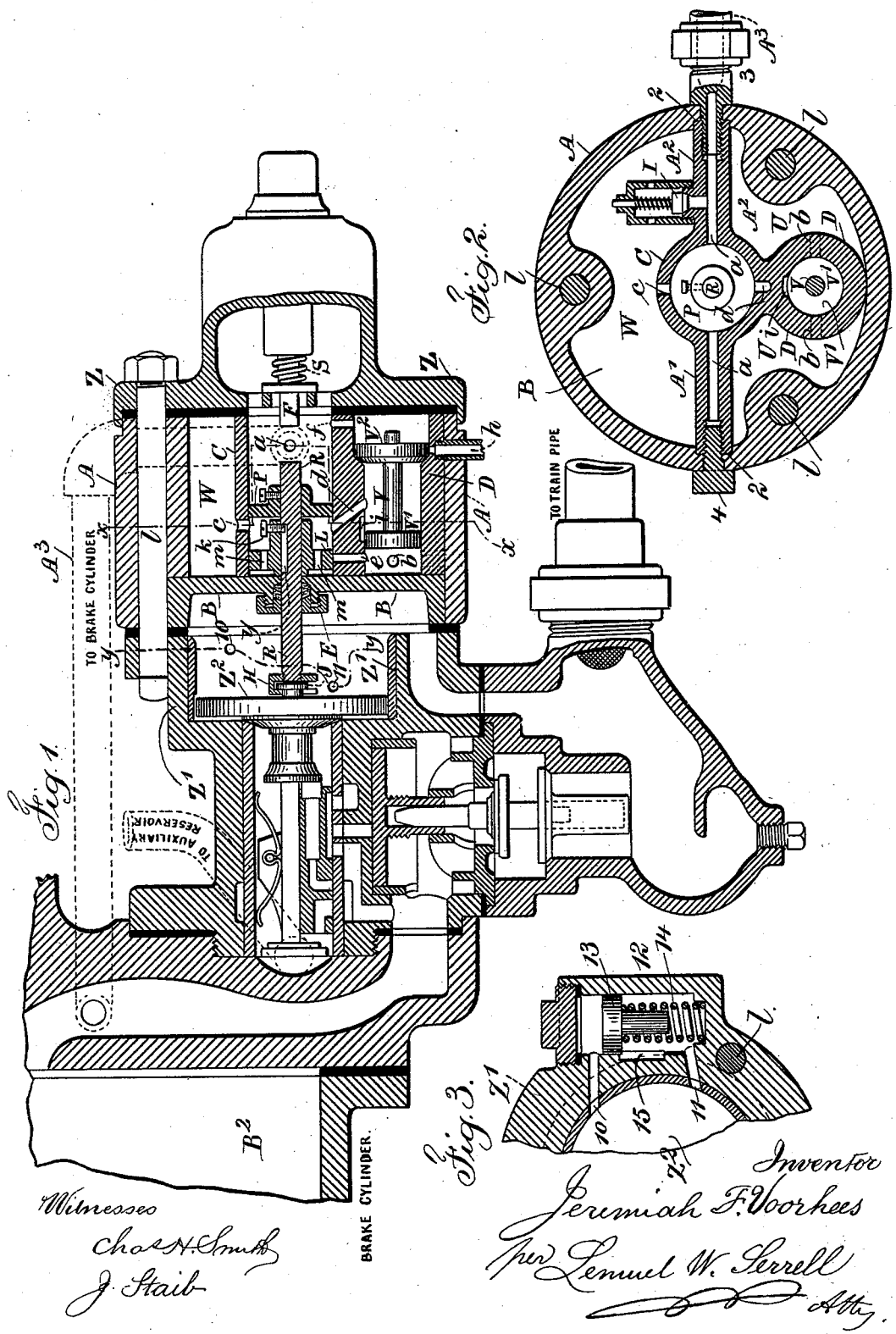

UNITED STATES PATENT OFFICE.

JEREMIAH F. VOORHEES, OF PHILADELPHIA, PENNSYLVANIA.

AIR-BRAKE FOR CARS.

SPECIFICATION forming part of Letters Patent No. 524,050, dated August 7, 1894.

Application filed July 11, 1893. Serial No. 480,152. (No model.)

*To all whom it may concern:*

Be it known that I, JEREMIAH F. VOORHEES, a citizen of the United States, residing at Philadelphia, in the State of Pennsylvania, have invented an Improvement in Air-Brakes for Cars, of which the following is a specification.

This invention relates to that class of brakes in which compressed air is made use of for applying the brakes, and the present improvement is especially available in that class of air brakes known as the Westinghouse automatic air brakes. In brakes of this class the auxiliary reservoir is connected to the brake cylinder and to the main train pipe, and there is a triple valve serving to admit air from the auxiliary reservoir to the brake cylinder when the brakes are to be applied. When the brake is released the valve allows the air pressure to pass out of the brake cylinder and also admits pressure from the train pipe to the auxiliary reservoir when the valve is in the released position. The brake cylinder and the auxiliary reservoir are usually so proportioned that with any given travel of the piston in the brake cylinder the amount of pressure in the brake cylinder when an application is made will be governed by the amount of decrease of pressure in the train pipe from the maximum to the point where the pressures in the train pipe, auxiliary reservoir and brake cylinder are equal, because the air under pressure will expand from the auxiliary reservoir into the brake cylinder until the train pipe pressure moves the actuating piston and its valve and closes the port leading to the brake cylinder; therefore the amount of pressure in the brake cylinder and consequently the power applied to the brakes can be governed by decreasing the train pipe pressure within the limits prescribed.

When an emergency application is made with a quick action triple valve, some pressure is admitted directly from the train pipe to the brake cylinder through the emergency valve, thus making the point where an equality of pressure in the train pipe, brake cylinder and reservoir will equal nearer the maximum pressure than when a service application is made, and the pressure is furnished to the brake cylinder from the auxiliary reservoir only.

The object of the present invention is to provide for a release of pressure from the brake cylinder that will be governed by the equalization of air pressures and be a counterpart of the application, so that an increase of pressure in the train pipe causes the pressure in the brake cylinder to be released in proportion to the amount of such train pipe increase within the same limits that the decrease in the train pipe pressure had governed the application of the brakes. The amount of pressure released from the brake cylinder by said increased pressure in the train pipe also depends upon the pressure existing in the auxiliary reservoir and brake cylinder at the time of making a release. I also provide for an automatic return of the triple valve to application position when an application has been made and the pressure in the brake cylinder decreased on account of leakage, and I also maintain the pressure in the auxiliary reservoir during this operation without the piston and its valve moving to the release position. Should there be a deficiency of pressure in the reservoir while the brakes are in application position, I provide for air under pressure passing from the train pipe to the auxiliary reservoir when the pressure in the train pipe is the greater.

I find that by taking pressure directly from the brake cylinder when the brakes are applied and using it in a cylinder at opposite sides of a piston that is connected to the main or actuating piston and its valve, when properly proportioned the maximum pressure obtained in the brake cylinder during the service application with the piston in said cylinder moving the minimum travel usually allowed, a pressure can be availed of that is nearly equal to the greatest effective pressure that can be obtained to move and hold the main piston and its valve to the release position, and thereby the release of the brakes can be controlled as reliably as can their application.

I do not change the train pipes, the air reservoir, the brake cylinder or any of the usual connections to the Westinghouse air brake, but I apply to the same the additional devices hereinafter described.

In the drawings, Figure 1 is a longitudinal section of the devices which I add to the triple air valve mechanism, and Fig. 2 is a cross section of the same at the line $x$, $x$, and Fig. 3 is a section of the air pressure valve between the train pipe and the connections to the brake cylinder and auxiliary reservoir at the line $y$, $y$. Fig. 4 is an elevation partially in section, and Fig. 5 is a cross section of the improvement applied to another style of triple valve.

$Z'$ represents the cylinder for the piston $Z^2$, to which is connected the ordinary valve of the air brake, and these parts are of the ordinary construction and act in the usual manner. I separate from the cylinder $Z'$ the head or lower cap $Z$ and interpose between them the cylinder $A$ which is provided with gaskets or packings so as to make the same air-tight, and the longer bolts $l$ passing through holes in bosses are made use of for connecting the end of the cylinder $Z'$ with the cap $Z$ and securing the parts firmly in position.

There are two connected cylinders $C$ and $D$ interposed between the cap $Z$ and the head $B$, the cylinder $C$ being axial with the cylinder $Z'$ and the ends of these cylinders are made air-tight when the cap $Z$ is drawn up to place. The walls $A'$ $A^2$ extend from the sides of the cylinder $C$ into grooves 2 in the inner surface of the cylinder $A$, and the parts are made air-tight so as to divide the cylinder $A$ into two air chambers $W$ and $U$, and there are through the walls ports or openings $a$ leading into the cylinder $C$; one port is closed by a plug 4 and the other has a tap and feed pipe $A^3$, which feed pipe passes to and opens into the brake cylinder $B^2$ of the automatic brake. This construction allows the connection to the brake cylinder to be made at either side of the cylinder $A$; and there is a branch port from the port $a$ into the chamber $W$ to which branch port the check valve $I$ is applied, the same opening outwardly into the chamber $W$, and the plug 4 closes the end of the port $a$ in the wall $A'$ at the opposite port to the one where the connection is made.

There is a port $c$ leading from the chamber $W$ into the cylinder $C$ and there are ports $e$, $d$ and $f$ leading from the cylinder $C$ into the cylinder $D$, and there is a port $h$ leading from the cylinder $D$ to the atmosphere, and there are ports $b$ leading from the sides of the cylinder $D$ into the chamber $U$. The cylinder $D$ is of two diameters, having a valve $V^2$ in the larger diameter closing against a seat, and a valve $V'$ in the smaller diameter of the cylinder $D$, these valves $V'$ and $V^2$ being connected by a stem $V$ and there is in the interior of the cylinder $D$ a groove or channel $i$ between the ports $e$ and $d$. This valve $V$ $V'$ $V^2$ is actuated automatically by the differences of air pressure, and when in the position represented in Fig. 1, the valve $V^2$ closes the port $h$ that leads to the external atmosphere.

The graduating stem $F$ and the spring $S$ around the stem are provided with the cap $Z$, as usual, and the end of the graduating stem passes into the cylinder $C$, and in line with the stem $R$, and this stem $R$ passes through the head $B$ and through a stuffing box $E$, and it is provided with a coupling $H$ for the knob or head $J$ upon the piston $Z^2$, so that the stem $R$ moves with the piston $Z^2$ when said piston receives its motion in the ordinary manner, and upon the stem $R$ is a piston $P$ firmly attached and fitting air-tight within the cylinder $C$, and there is also on the stem $R$ a valve piston $L$ having air holes $m$ through it, and there is upon the hub of the piston $L$ a screw $k$ passing into a groove $y$ that runs longitudinally along the stem $R$, and the location and position of the parts when at rest correspond to that shown in Fig. 1, and when the engineer turns his brake valve into the position for sudden stop or an intermediate position for more slowly stopping, and the action of the air upon the piston $Z^2$ causes the same to move and direct the air under pressure into the brake cylinder, as usual, the stem $R$ moves with the piston $Z^2$, and if the engineer's brake valve is turned into the position for sudden stop, the end of the stem $R$ comes in contact with the graduating stem $E$, as usual.

The operation of the parts which have been added and by which the releasing of the brake is made more or less gradual will be understood as follows:

For convenience the expression "right and left" are hereinafter used with reference to the parts as shown in the drawings.

When the air has been turned into the brake cylinder to act upon the brake the air passes back through the pipe $A^3$, port $a$, into the cylinder $C$, and through the port $f$ into the cylinder $D$, and the pressure acts to keep the valve $V^2$ upon its seat. The air under pressure also passes by the check valve $I$ into the chamber $W$, and through the port $c$ into the cylinder $C$ and by the port $d$ into the cylinder $D$, so that the pressure on both sides of the piston $P$ is equalized and the pressure is also equal in the space between the valves $V'$ $V^2$ and in the space in front of the valve $V^2$ the same air pressure acts on the larger area holding the valve $V^2$ to its seat. If the movement of the piston $Z^2$ has been full as when the engineer's valve is turned for a sudden stop, the stem $R$ and piston $P$ have been moved sufficiently for the left hand end of the groove $y$ to act upon the screw $k$ and move the piston $L$, causing the same to uncover the port $e$ and allow the air pressure to be equalized by the ports $b$ in the chamber $U$. When the brakes are to be released the engineer turns his valve to increase the pressure in the train pipe, and in so doing the piston $Z^2$ is moved toward and with its valves as usual and the air is allowed to escape from the brake cylinder, so that the pressure therein is lessened and the pressure is correspondingly lessened in the cylinder $C$ through the port $a$ and pipe $A^3$ to the brake cylinder, but the air pressure is maintained in the chamber W by the valve I closing and this air pressure acting against the piston P will when this pressure predominates draw the piston $Z^2$ and slide valve to lap position. Should the movement be sufficient to cause a slight re-application, the pressure in the train pipe predominating will move the piston back to lap position. The movement of the piston $Z^2$ and the movement of its valve that regulates the action of the air in the brake cylinder will be regulated by the relative pressures, because the piston $Z^2$ is larger than the piston P and the effective pressure on $Z^2$ must be sufficient to move the piston P against the pressure that is confined in the chamber W and left hand end of the cylinder C, and the movement of $Z^2$ and P will be governed accordingly as the air escapes from the brake cylinder and the cylinder C to the right of the piston P, which leaves the pressure to the left of the piston P more unbalanced and hence more free to counteract the pressure against the piston $Z^2$, and the brakes will be released automatically by the piston P serving to govern to a certain extent the movement of the piston $Z^2$ and the triple valve mechanism.

Should the engineer's valve be turned sufficiently to admit air pressure into the train pipe and move the piston $Z^2$ and its valve, so as to open the discharge from the brake cylinder, then the pressure in the pipes $A^3$, $a$ and cylinder C is reduced simultaneously with that in the brake cylinder, and the pressure also is reduced to the right of the valve $V^2$, and if the effective pressure to move the piston $Z^2$ to the release position is sufficient to hold it there until nearly all pressure in the brake cylinder has escaped, the pressure that is confined in the chamber W acting through the ports $c\ d$ causes the valves $V'\ V^2$ to move and uncover the port $h$ and allow such air pressure to escape, thus preventing the piston P from moving the piston $Z^2$ and the triple valve.

In applying the emergency stop, the piston L will have moved as before mentioned to uncover the port $e$ and allow the air pressure in the chamber U to equal the air pressure in the chamber W, the air passing through the ports $c\ m\ e\ b$, and the pressure in all parts of the automatic regulating apparatus will correspond to the pressure in the brake cylinder. When the engineer admits air pressure into the train pipe to release the brakes, the movement of the piston P will return the piston L toward the position shown in Fig. 1; and as the pressure in the brake cylinder and in the cylinder C is lessened and in the cylinder D to the right of the valve $V^2$ sufficiently, the pressure in the chamber U will cause the valves $V'\ V^2$ to move to the right and allow the pressure in the chamber U and in the chamber W to escape from the chamber U through the groove $i$ and pipe $h$.

In cases where the pressure in the train pipe is suddenly lessened in applying the emergency stop, the piston P and valve piston L are fully moved, and the air pressures in W U and D are equalized instantly, the ports $c\ d\ e\ m$ and $b$ all being open to the pressure from the brake cylinder, and when the pressure is raised in the train pipe sufficiently to move the piston $Z^2$ back to its normal position, the parts assume the position shown in Fig. 1, except the valves $V'\ V^2$ which after being moved remain open and air blows off from the brake cylinder and from the chambers W and U until the air under pressure has all escaped, the air passing from W through $c\ d$ and $h$ and from U through $b$ $i$ and $h$. After the emergency pressure has been applied, the release of the brakes can be graduated by my devices the same as when the ordinary service stop is used, up to the point where the differences of pressure on the opposite sides of the valve $V^2$ are such that such valve $V^2$ is moved, after which the air will blow off through $h$ until the brake cylinder is reduced to atmospheric pressure, and the valve $V^2$ will remain open until the brake is again applied, and the pressure through $a$ and $f$ moves said valve instantly to its seat before the air passes by I and the pressure accumulates in the chamber W.

In the movements herein specified of the respective parts, the piston $Z^2$ and its valve will be controlled by the piston P according to the relative pressures on the opposite sides of said piston P and according to the relative areas of the pistons P and $Z^2$, the latter being exposed to the pressure in the train pipe and in the auxiliary reservoir, and hence according to the effective pressure in the train pipe and that existing in the auxiliary reservoir and brake cylinder, so the automatic regulating mechanism will control the release of the brakes from the car wheels. In this manner the amount of air released from the brake cylinder will be governed by the amount of pressure raised in the train pipe and that existing in the auxiliary reservoir and brake cylinder and the relative areas of the piston $Z^2$ and its valve and the piston P of this attachment. By this means the release of the brakes will be automatic and more or less gradual and entirely under the control of the engineer, and hence upon heavy grades the brakes can be taken off more or less without losing control of the brakes by the lack of pressure, and this device also allows the engineer to stop the train without any shock, because he can lessen the pressure of the air in the brake cylinder any desired amount as the train is stopping up, thereby causing the power exerted by the brake to lessen as the speed of the train is lessened in the stopping of the train.

It will be apparent that in the sudden stopping of the train when pressure in the train pipe is rapidly reduced, the piston $Z^2$ and its valve are moved rapidly toward the graduating stem F, and the stem R acts upon the stem F and spring S to compress the same, and in this movement the end of the groove $y$ in the stem R acts upon the screw $k$ and moves the piston valve L so as to uncover the port $e$ and allow the air to pass to the cylinder D at the left of the valve V′ and into the chamber U, and when the brakes are released the piston P acts against the hub of the piston valve L and moves the same, covering the port $e$ and preventing the air from the chamber U returning through the cylinder C, thus confining the air so that the air of the chamber U moves the valves V′ V² so as to allow the air to escape from the cylinder D by the pipe $h$, and from the cylinder C before the brakes are entirely released. This is employed on account of the higher pressure in the brake cylinder and auxiliary reservoir resulting from air being admitted from the train pipe, as well as from the auxiliary reservoir into the brake cylinder in applying the brakes suddenly, giving less effective train pipe pressure to act on the piston Z² to release the brake.

The valves V′ V² being nearly of the same area on their inner opposite faces are nearly balanced, and the pressure on the right and larger surface of the valve V² being the same as that in the brake cylinder (the ports $f$ and $a$ always being open to the brake cylinder) the valves V′ V² are not brought into action except when the sudden or emergency stop is applied by the engineer's brake valve. The triple valve and the brake are controlled at all other times by the pistons Z² and P or when the pressure in the brake cylinder is almost exhausted and the pressure to the right of the valve V² is correspondingly reduced, the confined pressure in W to the left of P and between V′ V² acting on the slightly larger area at the back of V² moves V′ V², opens $h$ and allows the pressure in W to escape.

Under some circumstances when the train is running, especially on down grades, the brakes are applied to a certain extent and the handle of the engineer's valve is placed on what is called the "lap." Should there be a leakage of air from the brake cylinder so that the pressure is not maintained, the brake (with the ordinary valve) ceases to exert its force, the pressure in the auxiliary reservoir not being permitted to enter the brake cylinder unless it equals or exceeds that in the train pipe, because the pressure in the train pipe would force the piston Z² inward, closing the port leading to the brake cylinder. With the attachment previously described the pressure in the brake cylinder decreasing on account of leakage would also decrease to the right of the piston P, and the pressure confined in the chamber W acting on the left of the piston P would move it and the piston Z² and its valve to the right, bringing said valve to application position. There would however soon be a deficiency of pressure in the auxiliary reservoir, and it is for the purpose of maintaining this pressure without the piston Z² and its valve moving to the charging position which is also the release position, that I provide a connection from one side to the other side around the piston Z² and place in the same a valve with a spring sufficiently strong to prevent the valve moving except when the pressure in the auxiliary reservoir and the brake cylinder lessens to a certain extent below the pressure in the train pipe.

In the cylinder Z′ there are two holes 10 and 11 extending to the valve cylinder 12, which valve cylinder is either separate or a casting at one side of the triple valve case, and in this cylinder 12 is a valve 13 with a spring 14 and at one side of the cylinder is a slot 15.

When the piston Z² is in the position indicated in Fig. 1, both holes 10 and 11 are uncovered to the train pipe pressure, but when the engineer's valve is turned to "lap" and the piston Z² has moved its valve as usual, the hole 10 still remains open to the train pipe pressure but the hole 11 is at the other side of the piston Z² and hence opens into the passages leading to the brake cylinder and to the auxiliary reservoir which are at this time in communication, but should the pressure in the auxiliary reservoir and in the brake cylinder lessen sufficiently for the train pipe pressure acting through the hole 10 on top of the valve 13 to overcome the spring 14, the valve 13 will descend and open the slot 15 for the train pipe pressure to pass through the hole 10, slot 15 and hole 11 and maintain in the auxiliary reservoir and brake cylinder a pressure equal to that in the train pipe minus the resistance of the spring 14 to the movement of the valve, thus effectually preventing the pressure in the brake cylinder and auxiliary reservoir running down through any leakage that may occur in the brake cylinder or reservoir, provided train pipe pressure is maintained.

It is to be understood that the stem R and piston P continue to act in connection with the piston Z² in the manner before described in moving the valve automatically according to which pressure predominates.

Some air brakes with triple valves and moved by a piston do not have the graduating stem F and spring S, and hence the movement of the piston Z² is the same when the emergency stop is applied as it is under ordinary use. This attachment can be applied to this class of brakes, the valve piston L and the port $e$, however, being dispensed with, and a connection made by a pipe 8, as shown in Figs. 4 and 5, leading from the chamber U to the cylinder containing the actuating piston P² of the emergency valve that admits air directly from the train pipe to the brake cylinder. By this pipe 8 air pressure is admitted from the cylinder of the emergency valve, when the same is brought into action, into the chamber U and cylinder D to the left of the valve V′, through the ports $b\ b$, the pressure thus admitted being retained by a check valve C³ in the pipe 8 and released through the groove $i$, as before stated, and the operation of the parts as modified with this known class of automatic brakes will be the same as before described, because the pressure admitted through the pipe 8 will be the same in the chamber U as that from the brake cylinder into the chamber W.

For plain automatic triple valves the device shown in Figs. 4 and 5 may be used, except that the pipe 8 and check valve C³ are not required, as there is no extra pressure in the brake cylinder when acting quickly, because no air is admitted directly from the train pipe.

I claim as my invention—

1. The combination in the car brake apparatus with the triple valve, of automatic mechanism connected to the piston of such triple valve and controlled by the air pressure from the brake cylinder for automatically limiting the amount that the pressure is reduced to correspond to a proportionate amount of increase of pressure in the auxiliary reservoir and in the train pipe when releasing the brakes, substantially as specified.

2. The combination with the piston, of the valve that regulates the admission of air from the auxiliary reservoir to the brake cylinder, of the interposed cylinder A, the cylinder C and walls separating the cylinder A into the air chambers W and U, the piston P and stem R connected to and moving with the triple valve, the piston P being within the cylinder C, the piston valve L, the cylinder D and its connected valves V' V², there being a port $a$ connecting with the brake cylinder, a port $c$ between the cylinder C and the chamber W, ports $d\ e\ f$ between the cylinders C and D, and a port $b$ between the cylinder D and the chamber U, an escape port $h$ to the atmosphere, and the check valve I between the chamber W and the pipe to the brake cylinder, substantially as set forth.

3. The combination with the piston Z² and its valve that regulates the admission of air from the auxiliary reservoir to the brake cylinder, of the cylinder C, piston P and stem R connected to the piston Z² and its valve, an air chamber, pipe and check valve to admit air from the brake cylinder to act on the piston P and automatically regulate the movement of the triple valve and its piston, substantially as set forth.

4. The combination with the valve and its actuating piston, of a cylinder and an air pressure valve and its spring within such cylinder, holes or ports passing through the cylinder of the valve actuating piston, and so positioned as to be at opposite sides of said piston when the triple valve has been moved to apply the brakes, such ports extending to the cylinder at opposite sides of the air pressure valve, whereby air is allowed to pass into the brake cylinder and auxiliary reservoir to supply any defect of air from leakage and to maintain the proper relation between the pressure in the train pipe and in the brake cylinder, substantially as set forth.

Signed by me this 27th day of June, 1893.

J. F. VOORHEES.

Witnesses:
   GEO. T. PINCKNEY,
   A. M. OLIVER.